United States Patent
Cichosz et al.

(10) Patent No.: US 9,710,751 B2
(45) Date of Patent: Jul. 18, 2017

(54) PARALLEL TREE BASED PREDICTION

(71) Applicant: International Business Machines Corporation, Armonk, NY (US)

(72) Inventors: Pawel Cichosz, Warsaw (PL); Mieczyslaw Klopotek, Mazowiecki (PL); Krzysztof Skowronski, Brwinow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 447 days.

(21) Appl. No.: 14/327,918

(22) Filed: Jul. 10, 2014

(65) Prior Publication Data

US 2015/0032680 A1    Jan. 29, 2015

(30) Foreign Application Priority Data

Jul. 25, 2013    (GB) .................................. 1313245.1

(51) Int. Cl.
*G06N 5/04* (2006.01)
*G06N 5/00* (2006.01)
*G06F 17/30* (2006.01)

(52) U.S. Cl.
CPC ......... *G06N 5/04* (2013.01); *G06F 17/30587* (2013.01); *G06N 5/00* (2013.01)

(58) Field of Classification Search
None
See application file for complete search history.

(56) References Cited

U.S. PATENT DOCUMENTS

| | | | |
|---|---|---|---|
| 6,546,379 B1 | 4/2003 | Hong et al. | |
| 8,078,642 B1 | 12/2011 | Poutanen | |
| 8,290,882 B2 * | 10/2012 | Sharp .................. | G06N 99/005 706/10 |

(Continued)

FOREIGN PATENT DOCUMENTS

| | | |
|---|---|---|
| CN | 1435781 A | 8/2003 |
| CN | 1783092 A | 6/2006 |

OTHER PUBLICATIONS

T. Aho, et al., "Multi-Target Regression with Rule Ensembles," Journal of Machine Learning Research 13 (2012) 2367-2407.

(Continued)

*Primary Examiner* — Alan Chen
(74) *Attorney, Agent, or Firm* — Cantor Colburn LLP

(57) ABSTRACT

Embodiments relate to performing an ensemble model based prediction for a set of input data records. An aspect includes creating an assignment table assigning all data records in the input data set to a root node of a tree. Another aspect includes splitting the assignment tables into disjoint sub-tables. Another aspect includes storing each of the sub-tables to a respective data slice. Another aspect includes designating root nodes of each of the plurality of trees as a set of current nodes. Another aspect includes evaluating split conditions of each identified current node based on data records that are assigned to the current node; re-assigning said input data records to one or more child-nodes; using the child nodes of all current nodes as the set of current nodes; and calculating a prediction result from the assignment of data records to the leaf nodes of each of a plurality of trees.

20 Claims, 4 Drawing Sheets

(56) References Cited

U.S. PATENT DOCUMENTS

| | | |
|---|---|---|
| 2003/0229630 A1 | 12/2003 | Kamath et al. |
| 2010/0094800 A1 | 4/2010 | Sharp |
| 2013/0013392 A1 | 1/2013 | Kejariwal |
| 2014/0337269 A1* | 11/2014 | Eads .................. G06N 99/005 706/46 |

OTHER PUBLICATIONS

List of IBM Patents or Patent Applications Treated as Related; Jul. 10, 2014; pp. 1-2.
T. Feher, et al., "Using Regression Trees in Predictive Modelling," Production Systems and Information Engineering vol. 4 (2006); pp. 115-124.
D. Kocev, et al., "Ensembles of Multi-Objective Decision Trees," ECML '07 Proceedings of the 18th European conference on Machine Learning ; pp. 624-631.
L. Schietgat, et al., "Predicting Gene Function Using Hierachical Multi-Label Decision Tree Ensembles," BMC Bioinformatics 2010, 11:2; pp. 1-14.
UK Application No. GB1313245.1 from Intellectual Property Office International Search Report dated Jan. 15, 2014; 2 pages.
P. Cichosz, et al., "Parallel Decision or Regression Tree Growing," Related U.S. Appl. No. 14/327,883, filed Jul. 10, 2014.
Chinese Office Action for Application No. CN2014103599734 mailed Dec. 19, 2016; 7 pgs.

* cited by examiner

MULTIPLE COPIES OF INPUT DATA SET

PARALLEL TREE BASED PREDICTION

PRIORITY

This application claims priority to United Kingdom Patent Application No. GB 1313245.1, filed Jul. 25, 2013, and all the benefits accruing therefrom under 35 U.S.C. §119, the contents of which in its entirety are herein incorporated by reference.

BACKGROUND

The present disclosure relates generally to computer implemented prediction approaches, and more specifically to use of decision or regression trees for automated prediction.

Decision and regression trees are widely used predictive models. Decision trees are data structures which may be used for classifying input data into different, predefined classes. Regression trees are data structures which may be used for calculating a prediction result in the form of a data value, e.g. an integer, from input data. The calculation of a result data value as well as a classification into predefined classes from some input data will in the following be referred to as 'prediction'.

In order to increase accuracy, it is a common approach to use combinations of multiple decision trees or of multiple regression trees for calculating a prediction. Said collections of trees are known as 'tree ensemble models' or 'ensemble models'. The predictions of each tree in the ensemble model need to be combined using an appropriate combination scheme, e.g. an unweighted or weighted voting function for decision tree ensembles and an unweighted or weighted averaging for regression tree ensembles.

Applying a single tree model for prediction is typically a fast process, even for refined tree models. Unfortunately, this is not the case for ensemble models which may comprise thousands of individual trees: the time needed to predict a result using an ensemble of N trees is N times greater than the prediction time needed when using a single tree model. Thus, the gain in accuracy achieved by using multiple trees is connected with relatively high computational costs.

The computational costs of ensemble tree based prediction are also an obstacle for implementing such algorithms in (analytical) databases, which have to provide sufficient processing capacity for executing complex joins over multiple database tables and other computationally demanding tasks and therefore must not spend too much CPU power on tree based prediction.

Some in-database analytics environments, such as IBM Netezza Analytics™, already comprise some decision and regression tree based prediction logic. Said logic is implemented based on stored procedures and user-defined functions or aggregates. An overhead is associated with applying said tree-based prediction logic because the input data set on which the different trees of an ensemble model operate has to be redundantly stored. In addition, temporary table creation and the calling of the stored procedures for each tree increase the computational overhead. The latter kind of overhead may also be generated when the trees are processed sequentially on the same input data set. As a consequence, tables and index structures for the input data set have to be created and maintained redundantly. This increases the handling costs and slows down tree-based predictions in current in-database analytical solutions. Often, the used input data sets are small or medium-size. In this case the handling costs of the input data set and its copies relative to the computational costs of the actual prediction are particularly expensive in terms of memory and CPU consumption. If the existing single-tree "logic" is used to predict with multiple trees by applying all of them sequentially (one at a time), then the input data set does not have to be redundantly stored. However, overhead is associated with temporary table creation and stored procedure calls repeated for each tree.

SUMMARY

Embodiments relate to performing an ensemble model based prediction for a set of input data records, the ensemble model comprising a plurality of trees comprising decision trees or regression trees. An aspect includes creating, for each of the trees in the ensemble model, an assignment table, each assignment table assigning all data records in the input data set to a root node of said tree, in a database management system that is in control of a plurality of processing units and of a plurality of data slices, the database management system being operable to process data stored in any one of the data slices by a respective one of the processing units. Another aspect includes splitting each of the assignment tables into disjoint sub-tables. Another aspect includes storing each of the sub-tables to a respective one of the data slices. Another aspect includes designating root nodes of each of the plurality of trees as a set of current nodes corresponding to a current level of all the trees. Another aspect includes executing in parallel until all of the assignment tables are assigned to leaf nodes of the plurality of trees, by all processing units whose respective data slice comprises one or more of the sub-tables: performing a single pass through the sub-tables stored in the data slice of said processing unit, thereby identifying one or more of the current nodes having been assigned to one or more of the data records of said data slice; evaluating split conditions of each of the identified current nodes on the data records assigned to said current node; based on said evaluation, de-assigning input data records from each of said current nodes and re-assigning said input data records to one or more of the child-nodes of said current node; using the child nodes of all current nodes as the set of current nodes corresponding to the current level of each of the plurality of trees; and calculating a prediction result from the assignment of data records to the leaf nodes of each of the plurality of trees.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Figure 1:
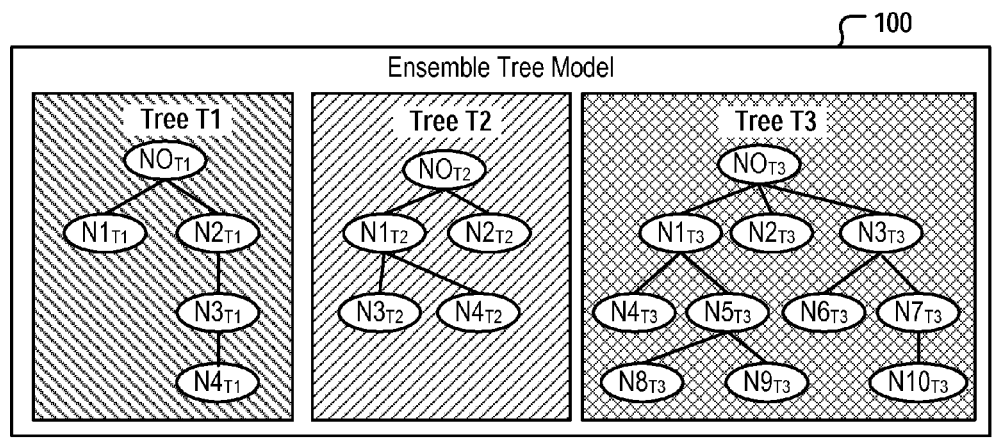
FIG. 1 depicts an embodiment of an ensemble model with trees.

Embodiments disclosed herein relate to parallel tree-based prediction. As used herein, a 'database' is an organized collection of data managed by a database management system (DBMS). In particular, the DBMS may be a columnar or a relational DBMS. Examples for a DBMS are well-known DBMSs such as MySQL, PostgreSQL, SQLite, and IBM DB2®. The DBMS may be embedded in an ERP system or an analytical platform such as IBM Netezza Analytics.

A 'split criterion' as used herein may be any kind of program logic associated to a node in a decision or regression tree which is used for evaluating attribute values of one or more attributes of an input data record. In dependence of the evaluation result, said input data record may be assigned ('handed down' or 'dispatched') to one of one or more child nodes of said node. The split criterion may be implemented as, for example, a comparison function operating on a particular attribute specific threshold value. In dependence of the input record's attribute value exceeding or lying at or below said threshold value, the data record may be assigned to one of the child nodes. Split criteria may be, for example, equality conditions, subset membership conditions, value conditions for discrete attribute values (each attribute value corresponds to a child node), inequality conditions, interval partitioning conditions and the like. For example, the split criterion may consist of one or more reference values or one or more disjoint reference value ranges in combination with a matching function. The matching function may compare an attribute value of the input data record with the attribute specific reference values or value ranges. Each reference value or value range may represent one of the child nodes of the current node comprising the split criterion and the input data record will be reassigned to the one child node whose reference value or reference value range matches the attribute value of the input data record. Alternatively, the split criterion may be a more complex function, e.g. an exponential or logarithmic function, a support vector machine (SVM), a neural network, a statistical function or any other suitable function for evaluating one or more attribute values and returning a decision to which child node a data record shall be assigned.

A 'parallel database system' as used herein is a DBMS that uses parallelization of at least some of its operations, in particular, operations like loading data from a storage, building indexes and evaluating queries. A parallel DBMS is operable to distribute data and processes automatically to multiple storage devices and CPUs. The distribution of data and processes may be automatically managed by the parallel DBMS based on performance considerations. A parallel DBMS may for example be based on a multiprocessor architecture or a hybrid architecture.

A 'data slice' as used herein is a data container located on a dedicated storage unit, e.g. a hard drive, whereby said storage unit is associated to a processing unit according to a 1:1 relationship. The relationship implies that the processing unit solely processes the data in the data container of its associated storage unit, but not the data of other data containers located on other storage units. In a multi-processor environment, each processor may have assigned exactly one storage unit and a respective data slice.

An 'input data set' as used herein comprises a plurality of data records. Each data record (also referred to as 'input data record') may be a record stored in a table of a database, may be a data object of an object oriented programming language or any other logical and functional unit of data. Each data record comprises one or more attributes having assigned respective attribute values. A data record may represent, for example, a machine, a patient, an animal, a good to be manufactured or sold. The attributes may be, for example, machine state parameters or environmental parameters such as temperature or moisture, gene variants or health parameters determined for said patient, the price, color, features or components of the good, or the like.

A 'table' may be a database table or a generic tabular data structure, such as a list object, an array object, a vector object or the like.

In one aspect, embodiments relate to a computer implemented method for performing an ensemble model based prediction for a set of input data records. An ensemble model comprises multiple trees which may be decision trees or regression trees. The method is implemented in a DBMS which is in control of a plurality of processing units and is in control of a plurality of data slices. The DBMS is operable to process data stored in any one of the data slices by a respective one of the processing units. The method comprises creating, for each of the trees in the ensemble model, an assignment table; each assignment table assigns all data records in the input data set to a root node of a respective one of the trees; splitting each of the assignment tables into disjoint sub-tables; storing each of the sub-tables to a respective one of the data slices; thereby, each data slice may comprise two or more sub-tables having been derived from different ones of the assignment tables; and using the root nodes of all trees as a set of current nodes corresponding to a current level of all the trees.

Then, all processing units whose respective data slice comprises one or more of the sub-tables, execute in parallel: performing a single pass through the sub-tables stored in the data slice of said processing unit, thereby identifying one or more of the current nodes having been assigned to one or more of the data records (which may be contained in the sub-tables or be indicated in the sub-tables) of said data slice; the identified current nodes may belong to one or more of the trees; evaluating split conditions of each of the identified current nodes on the data records assigned to said current node; the data records on which the evaluation is performed may be contained in or be indicated in the sub-tables stored in said data slices; in dependence on said evaluation, de-assigning input data records from each of said current nodes and re-assigning said input data records to one or more of the child-nodes of said current node; using the child nodes of all current nodes as the set of current nodes corresponding to the current level of all the trees; and repeating the method until all input data records of all the assignment tables are assigned to the leaf nodes of the trees. The method further comprises calculating a prediction result from the assignment of data records to the leaf nodes of all the trees.

In various embodiments, the distribution of the assignments of current nodes and data records to the different data slices (and respective processing units) in the form of disjoint sub-tables allows a parallel processing of the trees. Instead of distributing an input data set copy to different processing units, as applied in some state-of-the-art approaches, fractions (sub-tables) of assignments of data records and tree nodes are distributed to different data slices and processing units. This allows further accelerating the processing of multiple trees by processing all nodes within a current level of all the trees (a current forest level) in parallel. Thus, by a single pass (a read operation, e.g. a sequential scan) through the input data, all nodes of a current node level of all the trees can be processed. This reduces the total number of read operations to be performed on the data records for calculating the results of all trees.

According to embodiments each one of the assignment tables solely comprises data record identifiers and associated pointers. The data record identifiers of each assignment table consist of the identifiers of all input data records of the input data set and each one of the associated pointers points to one of the one or more current nodes of one of the trees. Each of the pointers associated with one of the identifiers assigns the data record of said identifier to the current node referred to by the pointer. That the distributed sub-tables merely comprise identifiers and pointers rather than copies of the full data records may reduce data traffic and avoid the redundant storage and management of the input data set. Thus, the size of the required storage space and the data traffic associated with parallelization the tree-based predictions is reduced and the predictions are accelerated.

According to embodiments each one of the disjoint sub-tables comprises disjoint sub-sets of the data record identifiers of the set of input data records. This may ensure that the data record identifiers are not passed twice in a single iteration and may ensure that the transferred sub-tables do not comprise redundant information. According to embodiments the DBMS transfers the sub-tables to the data slices and stores them into said data slices. According to embodiments the transfer of the sub-tables is executed via a network connection. Thus, the network traffic may be reduced and the spreading of the input data set to the multiple processing units may greatly be accelerated. According to embodiments the method further comprises: storing all sub-tables derived from the same one of the assignment tables in different ones of the data slices and updating the assignment of data records and current nodes contained in each of the sub-tables derived from the same one of the assignment tables in parallel.

According to embodiments the identifying of the one or more of the current nodes having assigned one or more of the data records in the data slices is implemented by evaluating in parallel, by the processing units of the respective data slices, the sub-tables stored in said data slices. The updating is executed in a decentralized, parallel manner, thereby freeing processing capacities of a one or more centrally managed processing units which may be used by the DBMS for other data management tasks such as processing database queries, creating index structures and the like. According to embodiments calculating the prediction result comprises: for each of the trees, calculating a tree-specific prediction as a derivative of the assignment of input data records to the leaf nodes of said tree; and calculating a final prediction result from the tree-specific predictions.

According to embodiments the trees of the ensemble model consist of decision trees and the leaf nodes of the trees have assigned class labels or class probability distributions. Calculating the tree-specific predictions comprises assigning the class labels or the class probability distributions of the leaf nodes to all input data records assigned to said leaf nodes. Calculating the final prediction result comprises, for each of the data records of the input data set: identifying one leaf node in each of the trees to which said data record is assigned according to the assignment tables; calculating, from all class labels or all class probability distributions of the identified leaf nodes a predicted class; the predicted class is one out of a plurality of predefined classes being predicted to comprise said data record with a higher probability than any one of the other predefined classes; and assigning a class label of the predicted class to said input data record. The assignment of all input data records of the input data set to the class labels of their respectively calculated predicted class is returned as the final prediction result. For example, the calculation of the predicted class may comprise identifying a class label being assigned to the highest number of said identified leaf nodes; and assigning the identified class label as the label of the predicted class to said data record of the input data set.

According to other embodiments the trees of the ensemble model consist of regression trees and the leaf nodes of the trees have assigned numeric target attribute values. Calculating the tree-specific predictions comprises assigning the numeric target attribute values of the leaf nodes to all input data records assigned to said leaf nodes. Calculating the final prediction result comprises, for each of the data records of the input data set: identifying one leaf node in each of the trees to which said data record is assigned according to the assignment tables; calculating a derivative attribute value from the numeric target attribute values of all identified leaf nodes; and assigning the derivative attribute value to said data record of the input data set. The assignment of all input data records of the input data set to their respectively calculated derivative attribute values is returned as the final prediction result. For example, the derivative attribute value assigned to a data record may be an average value calculated from the attribute values assigned to all leaf nodes identified for said data record. Alternatively, the derivative attribute value may be calculated by means of a weighted averaging approach wherein different weights are assigned to the trees and the weights are multiplied with the attribute values of the leaf nodes of the respective trees. A plurality of further approaches for calculating the derivative attribute values may be applied likewise.

According to other embodiments the calculation of the final prediction result from the leaf nodes of all the trees is executed by one of the processing units not being assigned to any one of the data slices which comprise a sub-table, allowing managing the trees and the tree-related results centrally. Thus, the trees do not have to be spread among the different processing units/data slices but may rather be maintained and evaluated centrally, thereby reducing the overhead for maintaining the tree structure in a database environment.

According to other embodiments the method is executed by a module of the database management system, the module being a parallel database engine or a data mining module, allowing implementation of the advanced parallelization of ensemble tree based prediction according to embodiments to legacy parallel DBMS without having to migrate the data of said legacy systems to new DBMS versions.

According to other embodiments the evaluating of the split condition of one of the identified current nodes on the data records assigned to said current node comprises: accessing the assignment table or said assignment table's sub-tables for identifying all data records in the input data set being currently assigned to said current node; and evaluating the split condition on one or more attribute values of each of the identified data records.

For example, a current node may have two child nodes and a split condition which is based on a threshold value for a particular attribute. If the value of said attribute of an evaluated input data record is smaller than said threshold value, said data record may be reassigned, according to said split criterion, to the first one of the child nodes. If the attribute value of the data record is equal to or larger than said threshold, the data record may be reassigned to the second one of the child nodes. According to other examples, the split condition may comprise a matching function and one or more reference values or disjoint reference value ranges. If the attribute value of the data record matches one of the reference values or lies within one of the reference ranges, said data record is reassigned to the child node represented by said reference value or value range. In some embodiments, each reference value or value range corresponds to and represents one of the child nodes. Thus, it is ensured that each data record is reassigned to exactly one of the child nodes and that each data record fulfils the requirements for being reassigned to one of the child nodes of the current node. According to still further examples, the split criterion may comprise a complex function, e.g. an exponential or logarithmic function for determining to which one of the child nodes of a current node a data record should be reassigned given the split condition of the current node the data record is assigned to and given the attribute value(s) of the data record to be evaluated by the split criterion of the current node.

In a further aspect, embodiments relate to a storage medium comprising computer-readable program code embodied thereon. The program code, when executed by a plurality of processing units, causes the processing units to execute a method according to anyone of the previous embodiments.

In a further aspect, embodiments relate to a computer system comprising a plurality of processing units, a plurality of storage units and a DBMS. The storage units respectively comprise a data slice. Data that is stored in any one of the data slices is selectively processed by a respective one of the processing units. The DBMS is in control of the processing units and is operable to execute a method for performing an ensemble model based prediction for a set of input data records. The ensemble model comprises multiple trees which may be decision trees or regression trees. The DBMS is operable to execute a method according to any one of the above embodiments.

According to further embodiments, the input data set is centrally stored in a database managed by the DBMS. At least some of the storage units which comprise a respective one of the data slices are connected to the data management system via a network. At least some of the sub-tables are transferred to the data slices via said network.

According to embodiments, all trees of the ensemble model are stored in the main memory of a computer system running the DBMS. Thus, the trees are not duplicated and redundantly stored in the data slices or any other form of parallelized processing node as known from some grid-based approaches for parallel tree based prediction. Merely the assignment tables are spread among the different data slices and processing units. This reduces the overhead and handling costs for the trees of the ensemble model and also reduces network traffic as the trees do not have to be transferred to the data slices. The assignments in the sub-tables are continuously updated in each iteration by the processing units assigned to the data slices until all data records in all sub-tables of all data slices have been assigned to a leaf node. Then, after said de-central, parallel updating of the assignments has finished and all the leaf nodes of all the trees have assigned the input data records, the updated sub-tables are read by the DBMS for calculating, by a centrally managed processing unit, a final result. This reduces network traffic as an information exchange between the central processing unit/DBMS and the data slices in only performed upon initially transferring the sub-tables to the data slices and for reading/transferring the sub-tables comprising the final assignment of data records to leaf nodes back to the DBMS/the central processing unit.

FIG. 1 depicts an ensemble model 100 as used in various embodiments. The depicted model comprises three trees T1-T3 for space reasons. Actually, an ensemble model may comprise multiple thousand trees. Each tree has a root node $NO_{T1}$-$NO_{T3}$ respectively acting as first current node of the trees when using the trees for calculating a prediction. Each of the trees provides a tree-specific result for one and the same input data set IDS. Finally, the results provided by all the trees T1-T3 of the ensemble model are combined to a final, combined result. For example, if the trees are decision trees and the majority of the trees of the ensemble model have assigned class label 'A' to a particular data record in the input data set (i.e., the majority of the trees "vote" for class 'A' in respect to said data record, and a minority of trees in said model 'vote' for class label 'B' in respect to said data record), the ensemble model will finally classify said input data record as belonging to class 'A'. By this way, all data records in the input data set may be classified and the classified set of input data record, or at least an assignment of said class labels to the input data records, may be returned as combined result of the ensemble model. Flow the calculation of the combined final result may be achieved in an efficient manner according to embodiments is described in FIG. 3-5.

Figure 2:
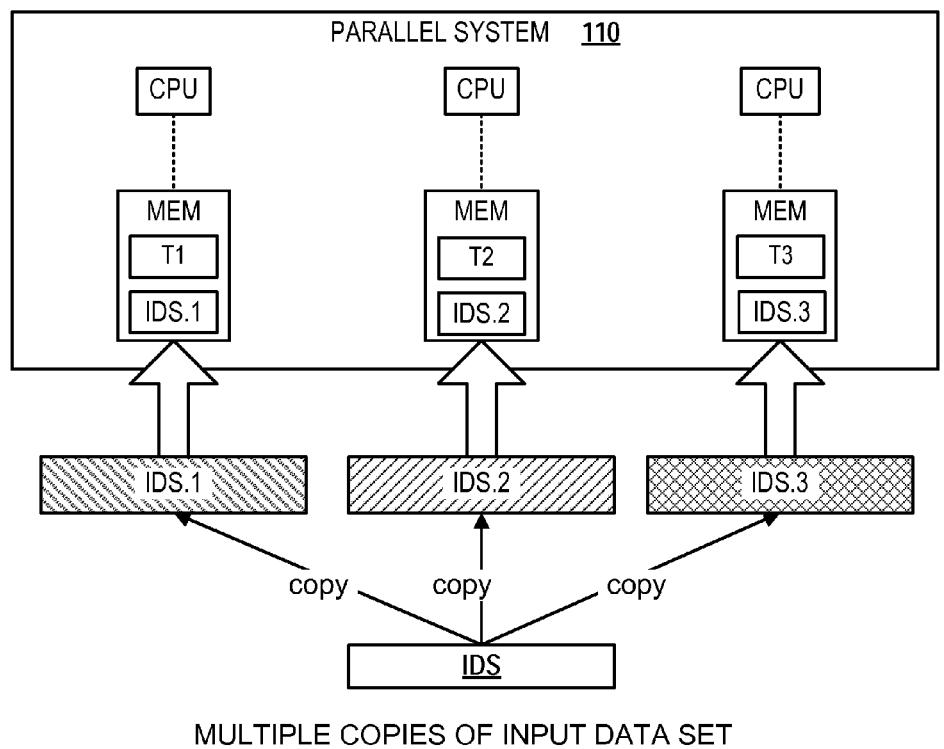
FIG. 2 depicts an embodiment of an approach for ensemble-based prediction.

FIG. 2 depicts the distribution of the input data set to multiple processing units according to a state of the art approach, e.g. a grid-based parallel execution of a single-tree based prediction. The input data set IDS is copied as many times as trees exist in a model and the data set copies as well as the respective trees may be distributed to the different CPUs. Thus, each of the CPUs has to maintain a tree and has to receive and store a copy of the input data set.

Figure 3:
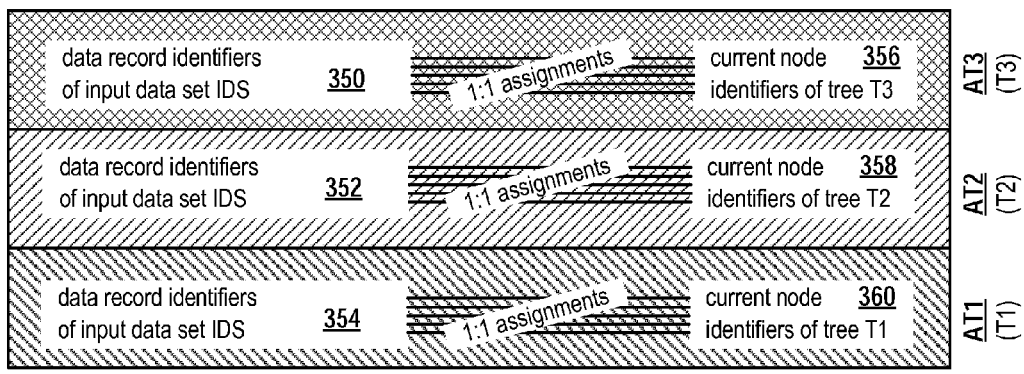
FIG. 3 depicts an embodiment of creation and distribution of data-record-to-node assignments.
Figure 3:
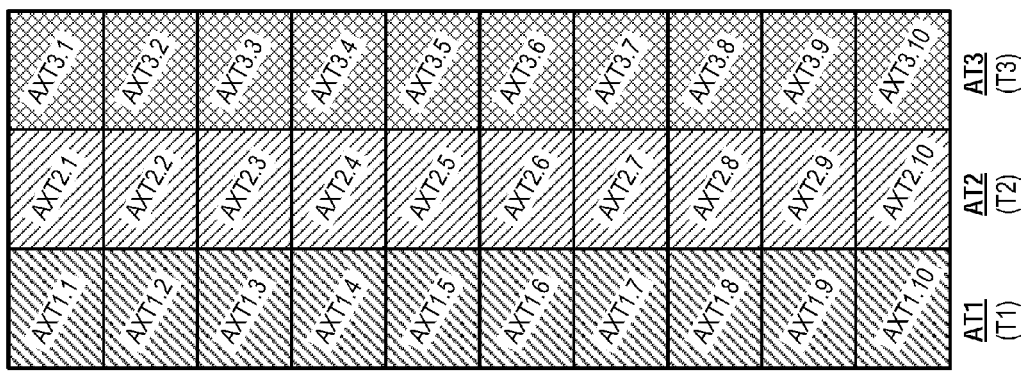
Figure 3:
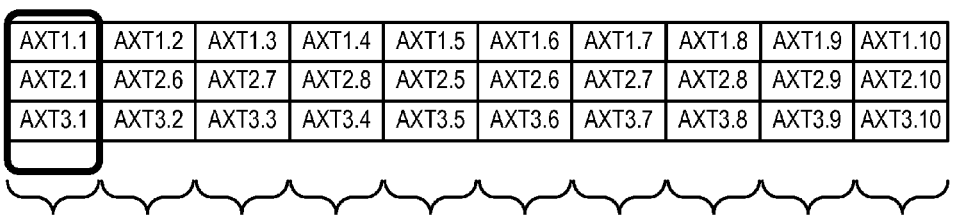
Figure 3:
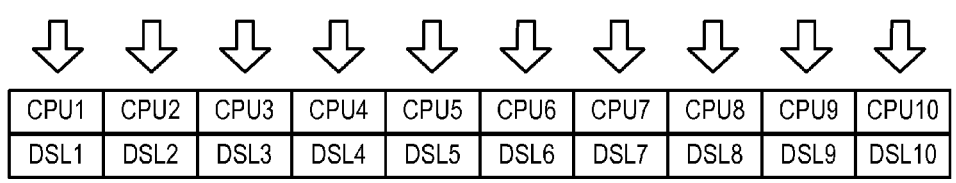

FIG. 2 depicts the pre-processing, distribution and parallel processing of the input data according to embodiments. For each of the trees T1-T3 of the ensemble tree model in parallel system 110, an assignment table AT1-AT3 is created. Each assignment table comprises at least all the information necessary for assigning each data record of an input data set IDS to a currently processed node (current node) of one of the trees. Assignment table AT1 assigns all data records of the input data set to the one or more current nodes of tree T1. Assignment table AT2 assigns all data records of the input data set to the one or more current nodes of tree T2, and so on. As shown in FIG. 3, according to some embodiments the assignment tables may also comprise copies of the data records of the input data set. However, in some embodiments, each of the assignment tables may merely comprise a unique list of identifiers 350, 352, 354 of all the data records of the input data set and some information, e.g. pointers or links, for assigning said identifies to a current node of the respective tree. In this case, the size of the assignment table is smaller than the input data set. Thus, in case an assignment table comprises copies of the data records of the input data set, the assignment table may be considered as a copy of the input data set. If an assignment table merely comprises the record identifiers assigned to some current nodes, said assignment table may be considered as 'virtual input data set' of reduced size. The assignment to the current nodes may be based on node identifiers 356, 358, 360. In each of the assignment tables, each of the data records is assigned to exactly one current node of the respective tree (1:1 assignment).

Then, each of the assignment tables is split into a plurality of disjoint sub-tables. For example, assignment table AT1 is split into sub-tables AXT1.1-AXT1.10. Assignment table AT2 is split into sub-tables AXT2.1-AXT2.10. Assignment table AT3 is split into sub-tables AXT3.1-AXT3.10. In some embodiments, the sizes of the sub-tables (corresponding to the number of data records or data record identifiers in each sub-table) are equal or approximately equal. The data records or data record identifiers of the different sub-tables are disjoint to avoid any redundant transferring or processing of data records. The creation of the assignment tables and the splitting into disjoint sub-tables may be executed automatically by a module of a parallel DBMS in preparation of the actual ensemble model-based prediction.

Figure 4:
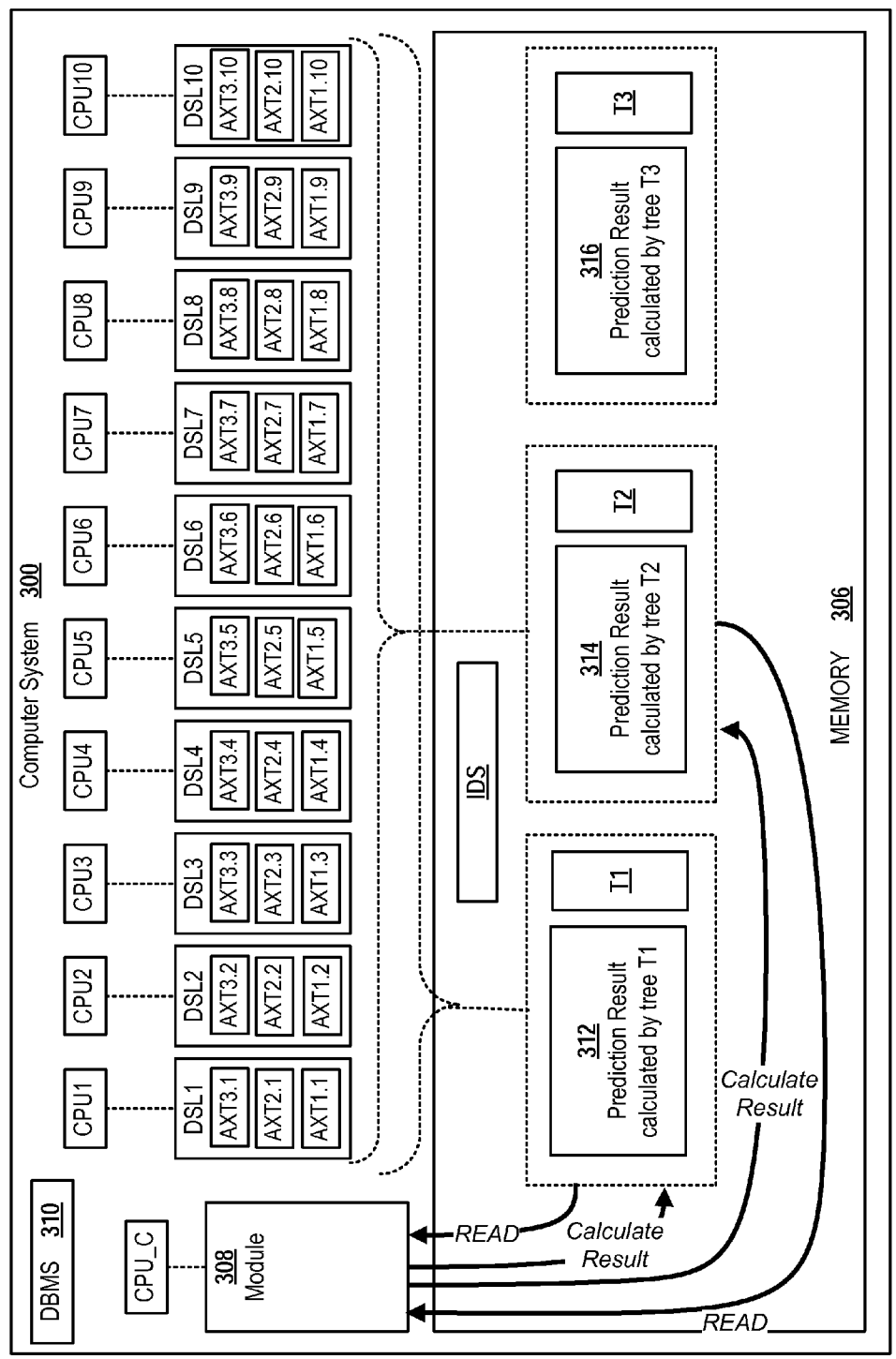
FIG. 4 is a block diagram of an embodiment of a computer system according to an embodiment.

The sub-tables having been derived from the same assignment table are spread among different data slices DSL1-DSL10 managed by a database management system as depicted, for example, in FIG. 4. The data stored in each of said data slices can solely be processed by a processing unit specifically assigned to said data slice by the DBMS and may optionally also be processible by one or more centrally managed processing units CPU_C. The processing units CPU1-CPU10 are under the control of the DBMS and are operable to work in parallel. For example, CPU1 may process and update the assignments of sub-tables AXT1.1, AXT2.1 and AXT3.1 while in parallel CPU2 may process and update the assignments of sub-tables AXT1.2, AXT2.2 and AXT3.2. Each data slice may comprise one or more sub-tables. However, in case a data slice comprises multiple sub-tables, the said sub tables are derived from different assignment tables and thus comprise assignments to different ones of the trees T1-T3. Each processing unit CPU1-CPU10 and its respective storage unit and data slice DSL1-DSL10 may be connected to the DBMS and the one or more central processing units CPU_C via a network and the distribution of the sub-tables to the respective data slices may be performed by the module of the DBMS via said network.

FIG. 4 depicts a computer system 300 comprising a plurality of processing units CPU_C, CPU1-CPU10, a database management system 310 and a main memory 306. A module 308 of the DBMS 310 is operable to coordinate the parallel processing of the input data set IDS by the trees T1-T3 by the processing units CPU1-CPU10. The processing units CPU1-CPU10 selectively process and update the sub-tables contained in their respectively assigned data slices DSL1-DSL10 as described before. The module 308 may use one or more further CPUs depicted as CPU_C which are not dedicated to a particular data slice. Rather, said processing unit(s) CPU_C may be used for centrally managing the trees T1-T3, for creating the assignment tables and sub-tables, for distributing the sub-tables as depicted in FIG. 3 and for calculating a final ensemble model result from the prediction results obtained from the individual trees T1-T3.

The trees T1-T3 constitute a forest. The trees T1-T3 and the tree-specific results are stored and centrally managed by module 308 in the main memory 306. The tree-specific prediction results and/or a final, combined prediction result may be stored to a non-volatile storage medium by module 308. Further, module 308 may centrally coordinate the parallel calculation of the tree-specific prediction results by the processing units CPU1-CPU10, whereby said parallel calculation is performed in an iterative manner. Each iteration corresponds to the processing of a current forest level, i.e., a currently processed hierarchical level shared by all the trees T1-T3 of the ensemble model. Thereby, the totality of current nodes of all said trees constitutes said current forest level. In each iteration, all data records or record identifiers of any one of the assignment tables are passed exactly once and are evaluated in respect to the split criterion of their respectively assigned current node for reassigning said data records to one of the child nodes of said current node. The totality of said child nodes constitutes the totality of current nodes of the next iteration and thus constitutes the current forest level of the next iteration. For example, by making reference to FIG. 1, the set of current nodes in the first iteration consists of the root nodes of all trees ($NO_{T1}$, $NO_{T2}$, $NO_{T3}$). Each root node has assigned the totality of input data records, whereby the assignment information is contained in sub-tables of tree-specific assignment tables. The split criterion of each of the root nodes is evaluated and the data records are de-assigned from their respective root nodes and re-assigned to one of the child nodes of said root node. The re-assignment depends on one or more attribute values of the data records which may also be stored in the sub-tables or which may be retrieved dynamically from the centrally managed input data set IDS. In the second iteration, the set of current nodes constituting the current forest level consists of the child nodes of the root nodes of all the trees ($N1_{T1}$, $N2_{T1}$, $N1_{T2}$, $N2_{T2}$, $N1_{T3}$, $N2_{T3}$, $N3_{T3}$). In the second iteration, all data records assigned to any one of said current nodes are evaluated in respect to the split criterion of their respectively assigned current node and are re-assigned to one of the one or more child nodes of said current nodes. In the third iteration, the set of current nodes constituting the current forest level consists of the child nodes of the current nodes processed in the second iteration ($N3_{T1}$, $N3_{T2}$, $N4_{T2}$, $N4_{T3}$, $N5_{T3}$, $N6_{T3}$, $N7_{T3}$) and so forth. Thus, the parallel multi-tree processing algorithm, upon each iteration, reassigns (dispatches) data records from one current forest level to the next until for each of the trees, all data records of the input data set are assigned to one of the leaf nodes of said tree. The tree-specific assignment of all data records of the input data set to the leaf nodes of a tree may be stored as the tree specific result 312, 314, 316 in the main memory of the computer system. The tree specific results may be used for calculating a final, combined prediction result of the ensemble tree model 100. While the updating of the assignment information stored in the sub-tables may be executed by the parallel processing units CPU1-CPU10, the storing and further processing of the tree-specific results may be performed by one or more central processing units CPU_C. This is indicated in FIG. 3 for trees T1 and T2 by the read/calculate arrows and is omitted in respect to tree T3 for space reasons. The sub-tables AXT1.1, . . . , AXT3.10 comprising information to which current node of which tree the data records of a particular sub-table are assigned are stored in the individual data slices and are continuously updated by the dedicated processing unit CPU1-CUP10 of said data slice in each iteration.

A pseudocode of one implementation variant as shown in Table 1 below illustrates the parallel, forest-level-wise calculation of a prediction result.

TABLE 1

Figure 5:
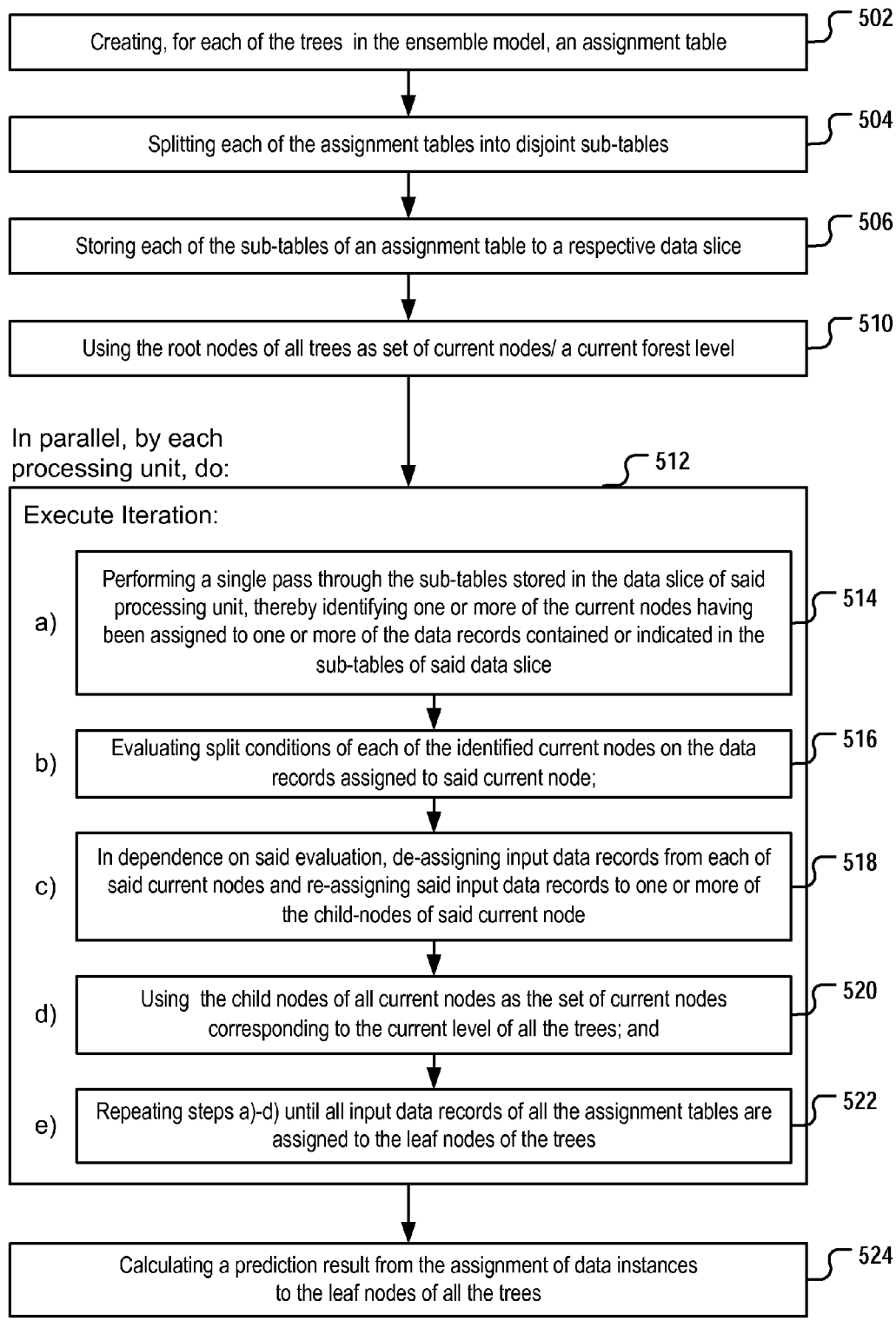
FIG. 5 depicts an embodiment of a method of parallel ensemble model based prediction.

Definitions:

x: input data record
n: node
$n_l$: leaf node
Q: the set of (unprocessed) current nodes of the current forest level
(comprising one or more current nodes from each of the trees in the ensemble model)
Q': the set of (unprocessed) current nodes of the forest level to be processed in
the next iteration (comprising one or more nodes from each of the trees in the
ensemble model)
$n_{cur,t}$: current node of tree t
Multiple tree prediction by iteration over forest levels with distributed data:

1: for each one of the trees t = 1; 2; : : : ;m create an association table, each
association table assigning all data records of an input data set IDS to the root node
of said tree t;
2: partition each of the association tables into disjoint sub-tables;
3: distribute all sub-tables derived from any one of the assignment tables
among different data slices DSLd; d = 1; 2; : : : ; p , the data slices respectively being
processible by separate processing units;
4: create a set Q of currently processed nodes of any one of the trees t = 1; 2; :
: :m, whereby Q consists of the root nodes of all the trees;
//iterate through the trees in parallel, thereby reassigning the input data records
forest-level-wise until all input data records are assigned to the leaf nodes of the trees:
5: while there remain some tree-node pairs <t; n> such than n is not a leaf and
one or more input data records x are assigned to n do
6: for all data slices DSLd; d = 1; 2; : : : ; p in parallel do:
//sequential scan over all sub-tables in DSLd:
7: for all assignments $a_{xt}$ of input data records x ∈ DSLd to any one of the
trees t do
8: identify a current node $n_{cur,t}$ of tree t assigned to x, whereby $n_{cur,t}$ ∈ Q;
9: evaluate split criterion of $n_{cur,t}$ on one or more attribute values of x;
10: identify a target child node $n_{ctar,t}$ out of one or more child nodes of $n_{cur,t}$ in
dependence on said evaluation;
11: de-assigning x from current node $n_{cur,t}$ of tree t and re-assigning x to target
child node $n_{ctar,t}$ of tree t;
12: add target child node $n_{ctar,t}$ of tree t to Q';
13: end for
14: end for
15: Q:=Q';
16: end while
17: for all data slices DSLd; d = 1; 2; : : : ; p in parallel do:
18: for all assignments $a_{xt}$ of input data records x ∈ DSLd to any one of the
trees t do //sequential scan over all sub-tables in DSLd
19: identifying all tree-leaf node pairs <t; $n_l$> being assigned to x for
accumulating class labels or numeric target attribute values predicted by a
particular tree t for x:
20: end for
21: end for
22: for each of the input data records of the input data set IDS, calculate a
final predicted result value from the accumulated class labels or numeric target
attribute values predicted by all the trees FIG. 5 depicts a computer implemented method for performing an ensemble model based prediction for a set IDS of input data records. In the following, reference will also be made to FIGS. 1, 3 and 4 as the method may be implemented in a computer system as depicted in FIG. 4 and may involve the distribution of sub-tables as depicted in FIG. 3. The method may be executed, for example, by the module 308 of the database management system 310 of FIG. 3. In block 502, for each of the trees T1-T3 in an ensemble model 100, an assignment table AT1-AT3 is created. Each assignment table assigns all data records in the input data set to a root node $NO_{T1}$, $NO_{T2}$, $NO_{T3}$ of a respective tree. In the next block 504, each of the assignment tables is split into disjoint sub-tables AXT1.1-AXT1.10; AXT2.1-AXT2.10; AXT3.1-AXT3.10. The sub-tables may be transferred to different data slices as depicted in FIG. 3. In block 506, each of the sub-tables is stored to a respective one of the data slices. In block 510, the root nodes of all the trees are used as a set of current nodes. The set of current nodes corresponds to and constitutes a current level of all the trees (current forest level). Then, the processing units in parallel execute a method 512, comprising blocks 514-522. In block 514, a single pass is performed through the sub-tables stored in the data slice of said processing unit, thereby identifying one or more of the current nodes having been assigned to one or more of the data records of said data slice; evaluating, in block 516, split conditions of each of the identified current nodes on the data records assigned to said current node; in dependence on said evaluation, de-assigning in block 518 input data records from each of said current nodes and re-assigning said input data records to one or more of the child-nodes of said current node; using, in block 520, the child nodes of all current nodes as the set of current nodes corresponding to the current level of all the trees; and, in block 522, repeating blocks 514, 516, 518, and 520 until all input data records of all the assignment tables are assigned to the leaf nodes of the trees.

In a final calculation block 524, a final, combined prediction result is calculated from the assignment of data records to the leaf nodes of all the trees. Said assignment may comprise, for example, class label information allowing classifying the individual data records, or may be numeric target attribute values which allow calculating one or more final predicted data values.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer implemented method for performing an ensemble model based prediction for a set of input data records, the ensemble model comprising a plurality of trees comprising decision trees or regression trees, the method comprising:

creating, for each of the trees in the ensemble model, an assignment table, each assignment table assigning all data records in the input data set to a root node of said tree, in a database management system that is in control of a plurality of processing units and of a plurality of data slices, the database management system being operable to process data stored in any one of the data slices by a respective one of the processing units;

splitting each of the assignment tables into disjoint sub-tables;

storing each of the sub-tables to a respective one of the data slices;

designating root nodes of each of the plurality of trees as a set of current nodes corresponding to a current level of all the trees;

executing in parallel until all of the assignment tables are assigned to leaf nodes of the plurality of trees, by all processing units whose respective data slice comprises one or more of the sub-tables:

performing a single pass through the sub-tables stored in the data slice of said processing unit, thereby identifying one or more of the current nodes having been assigned to one or more of the data records of said data slice;

evaluating split conditions of each of the identified current nodes on the data records assigned to said current node;

based on said evaluation, de-assigning input data records from each of said current nodes and re-assigning said input data records to one or more of the child-nodes of said current node;

using the child nodes of all current nodes as the set of current nodes corresponding to the current level of each of the plurality of trees; and calculating a prediction result from the assignment of data records to the leaf nodes of each of the plurality of trees.

2. The computer-implemented method of claim 1, wherein each one of the assignment tables comprises data record identifiers and associated pointers, wherein the data record identifiers of each assignment table consist of the identifiers of all input data records of the input data set and each one of the associated pointers points to one of the one or more current nodes of one of the trees, wherein each of the pointers associated with one of the identifiers assigns the data record of said identifier to the current node referred to by the pointer.

3. The computer-implemented method of claim 1, wherein each of the disjoint sub-tables comprises disjoint sub-sets of the data record identifiers of the set of input data records.

4. The computer-implemented method of claim 1, further comprising transferring, by the database management system, the sub-tables to the data slices and storing them into said data slices via a network connection.

5. The computer-implemented method of claim 1, further comprising: storing all sub-tables derived from the same one of the assignment tables in different ones of the data slices, wherein the de-assigning input data records comprises updating the assignment of data records and current nodes contained in each of the sub-tables derived from the same one of the assignment tables in parallel.

6. The computer-implemented method of claim 1, wherein identifying of the one or more of the current nodes having assigned one or more of the data records in the data slices is implemented by evaluating in parallel, by the processing units of the respective data slices, the sub-tables stored in said data slices.

7. The computer implemented method of claim 1, wherein calculating the prediction result comprises:

for each of the plurality of trees, calculating a tree-specific prediction as a derivative of the assignment of input data records to the leaf nodes of said tree; and calculating a final prediction result from the tree-specific predictions.

8. The computer-implemented method of claim 7, wherein the leaf nodes of the trees have assigned class labels or class probability distributions, wherein the plurality of trees are decision trees, and wherein calculating the tree-specific predictions comprises:

assigning the class labels of the leaf nodes to all input data records assigned to said leaf nodes; and wherein calculating the final prediction result comprises, for each of the data records of the input data set:

identifying one leaf node in each of the trees to which said data record is assigned according to the assignment tables;

calculating, from all class labels or all class probability distributions of the identified leaf nodes a predicted class, the predicted class being is one out of a plurality of predefined classes, the predicted class being calculated to comprise said data record with a higher probability than any one of the other predefined classes; and assigning a class label of the predicted class to said input data record;

wherein the assignment of all input data records of the input data set to their respectively calculated class labels is returned as the final prediction result.

9. The computer-implemented method of claim 8, wherein the leaf nodes of the trees have assigned numeric target attribute values, wherein the trees are regression trees, wherein calculating the tree-specific predictions comprises:

assigning the numeric target attribute values of the leaf nodes to all input data records assigned to said leaf nodes; and wherein calculating the final prediction result comprises, for each of the data records of the input data set:

identifying one leaf node in each of the trees to which said data record is assigned according to the assignment tables;

calculating a derivative attribute value from the numeric target attribute values of all identified leaf nodes; and assigning the derivative attribute value to said data record of the input data set;

wherein the assignment of all input data records of the input data set to their respectively calculated derivative attribute values is returned as the final prediction result.

10. A computer program product for performing an ensemble model based prediction for a set of input data records, the ensemble model comprising a plurality of trees comprising decision trees or regression trees, the computer program product comprising a computer readable storage medium having program instructions embodied therewith, the program instructions executable by a processing circuit to cause the processing circuit to:

create, for each of the trees in the ensemble model, an assignment table, each assignment table assigning all data records in the input data set to a root node of said tree, in a database management system that is in control of a plurality of processing units and of a plurality of data slices, the database management system being operable to process data stored in any one of the data slices by a respective one of the processing units;

split each of the assignment tables into disjoint sub-tables;

store each of the sub-tables to a respective one of the data slices;

designate root nodes of each of the plurality of trees as a set of current nodes corresponding to a current level of all the trees;

execute in parallel until all of the assignment tables are assigned to leaf nodes of the plurality of trees, by all processing units whose respective data slice comprises one or more of the sub-tables:

performing a single pass through the sub-tables stored in the data slice of said processing unit, thereby identifying one or more of the current nodes having been assigned to one or more of the data records of said data slice;

evaluating split conditions of each of the identified current nodes on the data records assigned to said current node;

based on said evaluation, de-assigning input data records from each of said current nodes and re-assigning said input data records to one or more of the child-nodes of said current node;

using the child nodes of all current nodes as the set of current nodes corresponding to the current level of each of the plurality of trees; and calculating a prediction result from the assignment of data records to the leaf nodes of each of the plurality of trees.

11. The computer program product of claim 10, wherein each one of the assignment tables comprises data record identifiers and associated pointers, wherein the data record identifiers of each assignment table consist of the identifiers of all input data records of the input data set and each one of the associated pointers points to one of the one or more current nodes of one of the trees, wherein each of the pointers associated with one of the identifiers assigns the data record of said identifier to the current node referred to by the pointer.

12. The computer program product of claim 10, wherein each of the disjoint sub-tables comprises disjoint sub-sets of the data record identifiers of the set of input data records.

13. The computer program product of claim 10, further comprising transferring, by the database management system, the sub-tables to the data slices and storing them into said data slices via a network connection.

14. The computer program product of claim 10, further comprising: storing all sub-tables derived from the same one of the assignment tables in different ones of the data slices, wherein the de-assigning input data records comprises updating the assignment of data records and current nodes contained in each of the sub-tables derived from the same one of the assignment tables in parallel.

15. The computer program product of claim 10, wherein identifying the one or more of the current nodes having assigned one or more of the data records in the data slices is implemented by evaluating in parallel, by the processing units of the respective data slices, the sub-tables stored in said data slices.

16. A computer system for performing an ensemble model based prediction for a set of input data records, the ensemble model comprising a plurality of trees comprising decision trees or regression trees, the system comprising:

a memory; and a processor, communicatively coupled to said memory, the computer system configured to perform a method comprising:

creating, for each of the trees in the ensemble model, an assignment table, each assignment table assigning all data records in the input data set to a root node of said tree, in a database management system that is in control of a plurality of processing units and of a plurality of data slices, the database management system being operable to process data stored in any one of the data slices by a respective one of the processing units;

splitting each of the assignment tables into disjoint sub-tables;

storing each of the sub-tables to a respective one of the data slices;

designating root nodes of each of the plurality of trees as a set of current nodes corresponding to a current level of all the trees;

executing in parallel until all of the assignment tables are assigned to leaf nodes of the plurality of trees, by all processing units whose respective data slice comprises one or more of the sub-tables:

performing a single pass through the sub-tables stored in the data slice of said processing unit, thereby identifying one or more of the current nodes having been assigned to one or more of the data records of said data slice;

evaluating split conditions of each of the identified current nodes on the data records assigned to said current node;

based on said evaluation, de-assigning input data records from each of said current nodes and re-assigning said input data records to one or more of the child-nodes of said current node;

using the child nodes of all current nodes as the set of current nodes corresponding to the current level of each of the plurality of trees; and calculating a prediction result from the assignment of data records to the leaf nodes of each of the plurality of trees.

17. The system of claim 16, wherein each one of the assignment tables comprises data record identifiers and associated pointers, wherein the data record identifiers of each assignment table consist of the identifiers of all input data records of the input data set and each one of the associated pointers points to one of the one or more current nodes of one of the trees, wherein each of the pointers associated with one of the identifiers assigns the data record of said identifier to the current node referred to by the pointer.

18. The system of claim 16, wherein each of the disjoint sub-tables comprises disjoint sub-sets of the data record identifiers of the set of input data records.

19. The system of claim 16, further comprising transferring, by the database management system, the sub-tables to the data slices and storing them into said data slices via a network connection.

20. The system of claim 16, further comprising: storing all sub-tables derived from the same one of the assignment tables in different ones of the data slices, wherein the de-assigning input data records comprises updating the assignment of data records and current nodes contained in each of the sub-tables derived from the same one of the assignment tables in parallel.

* * * * *